United States Patent
Gresset

(10) Patent No.: US 11,159,209 B2
(45) Date of Patent: Oct. 26, 2021

(54) METHOD FOR CONFIGURING WIRELESS TRANSMITTER, COMPUTER PROGRAM PRODUCT, STORAGE MEDIUM, AND WIRELESS TRANSMITTER

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/734,062

(22) PCT Filed: Jun. 4, 2019

(86) PCT No.: PCT/JP2019/022842
§ 371 (c)(1),
(2) Date: Dec. 1, 2020

(87) PCT Pub. No.: WO2020/017186
PCT Pub. Date: Jan. 23, 2020

(65) Prior Publication Data
US 2021/0226676 A1 Jul. 22, 2021

(30) Foreign Application Priority Data
Jul. 19, 2018 (EP) .................................. 18184437

(51) Int. Cl.
*H04B 7/04* (2017.01)
*H04B 7/0452* (2017.01)
(Continued)

(52) U.S. Cl.
CPC ......... *H04B 7/0452* (2013.01); *H04B 7/0695* (2013.01); *H04W 72/046* (2013.01)

(58) Field of Classification Search
CPC .. H04B 7/0452; H04B 7/0695; H04W 72/046
(Continued)

(56) References Cited

U.S. PATENT DOCUMENTS

| 2008/0069058 A1 | 3/2008 | Geng et al. | |
| 2014/0120974 A1* | 5/2014 | Sediq ................. | H04W 52/143 455/509 |

* cited by examiner

*Primary Examiner* — Kevin M Burd
(74) *Attorney, Agent, or Firm* — Birch, Stewart, Kolasch & Birch, LLP.

(57) ABSTRACT

A wireless transmitter comprises a massive transmit antennas arrangement, a set of modulators, an analog precoder, and a codebook storing candidate predefined beam configurations corresponding to specific phase pattern configurations of the analog precoder. Transmissions of frames by the wireless transmitter are performed by using combinations of concurrent beam configurations stored in the codebook. The wireless transmitter further comprises an online fair scheduler determining which combinations of concurrent beams to be applied so as to take into account a fairness constraint between wireless receivers in view of effective channel conditions, and an offline MU-MIMO fair scheduler implementing a first configuration phase in which candidate combinations of concurrent beams are determined by using long-term statistics, and the online fair scheduler implements a second configuration phase in the combinations of concurrent beams to be applied are selected among the candidate combinations of concurrent beams determined by the offline MU-MIMO fair scheduler.

7 Claims, 7 Drawing Sheets

(51) Int. Cl.
    *H04B 7/06*          (2006.01)
    *H04W 72/04*       (2009.01)

(58) Field of Classification Search
    USPC .......................................................... 375/267
    See application file for complete search history.

METHOD FOR CONFIGURING WIRELESS TRANSMITTER, COMPUTER PROGRAM PRODUCT, STORAGE MEDIUM, AND WIRELESS TRANSMITTER

TECHNICAL FIELD

The present invention generally relates to a method for configuring a MU-MIMO (Multi-User-Multiple Inputs Multiple Outputs) wireless transmitter for transmitting a frame toward a plurality of MIMO wireless receivers, wherein the wireless transmitter transmits the frame using an analog precoder connected to a massive transmit antennas arrangement. The invention is more particularly suitable for millimeter wave wireless transmissions.

BACKGROUND ART

Analog precoders mix modulated analog signals onto inputs of a massive transmit antennas arrangement. For example, Na=4096 transmit antennas are used. Mixing usually consists in duplicating each input modulated analog signal into Na copies thereof, in performing a phase rotation of each signal copy, routing each phase-rotated signal copy to one transmit antenna input, and summing all rotated signal copies arriving at each transmit antenna input. The phases applied are typically different. Thus, an equivalent beam resulting from signal duplication and phases rotation to the transmit antennas is associated with each modulated analog signal. Thus, considering Np modulated analog signals, Np equivalent beams are observed between the Np inputs of the analog precoder and a wireless receiver.

The phase rotations performed by the analog precoder are controllable. A codebook CB of Nb=Na phase patterns can be used. For example, a DFT (Discrete Fourier Transform) matrix of size equal to Na*Na is used to create the codebook CB of Na equivalent beams, defined by the columns of the DFT matrix. A subset of Np≤Na beams from the codebook CB can be selected and used concurrently for transmitting a frame, thus creating a combination of concurrent beams. And if phases switching is fast enough, the combination of concurrent beams can be changed from one frame to another without significant overhead on overall throughput. It means that the same combination of concurrent beams is used for transmitting one or more whole frames, i.e. for all time and frequency resources used to transmit said one or more whole frames.

Usually, the configurations of the combination of concurrent beams are selected so as to maximize received power or SINR (Signal-to-Interference-plus-Noise Ratio) toward wireless receivers. A digital precoder, placed upstream the analog precoder, can then be computed in order to mitigate interference observed between the concurrent beams in use.

In wireless transmissions, time and frequency resources allocation to the wireless receivers is performed by taking account of an amount of data to be delivered to each wireless receiver (which depends on application layer requirements), further of a quality of a wireless channel from the wireless transmitter to each wireless receiver (which depends on position of each wireless receiver with respect to the wireless transmitter and on channel realization toward each wireless receiver), and further by optimizing a proportional fairness metric between the wireless receivers. Thus, the wireless transmitter (such as cellular telecommunication network base station) has to solve a scheduling optimization problem that takes into account several aspects among which:

which wireless receivers should be grouped together for performing a MU-MIMO transmission, and on which time and frequency resource; and how the analog precoder, and potentially the upstream digital precoder (if any), should be configured for each group of wireless receivers.

When the quantity of wireless receivers to be grouped together is small enough (e.g. 2), low complexity solutions can be envisaged in order to solve the scheduling optimization problem while meeting a fairness constraint. However, when increasing the quantity of wireless receivers to be simultaneously served and when considering flexibility brought by using concurrent analog beams, the prior art solutions summarized above become intractable.

It is thus desirable to overcome the aforementioned drawbacks of the prior art. It is more particularly desirable to provide a solution that reduces complexity when scheduling data transmissions toward wireless receivers in a MU-MIMO context.

It is more particularly desirable to provide a solution that is simple and cost-effective.

SUMMARY OF INVENTION

To that end, the present invention concerns a method for configuring a wireless transmitter comprising a massive transmit antennas arrangement, a set of Modulators and an analog precoder mixing modulated analog signals output by the set of modulators onto respective inputs of the massive transmit antennas arrangement, the wireless transmitter further comprising a codebook storing candidate predefined beam configurations corresponding to a specific phase pattern configuration of the analog precoder, transmissions of frames by the wireless transmitter being performed onto respective time and frequency resources by using combinations of concurrent beam configurations among the candidate predefined beam configurations stored in the codebook so as to perform MU-MIMO transmissions toward wireless receivers, the method being implemented by the wireless transmitter. In addition, the wireless transmitter further comprises an online fair scheduler determining which combinations of concurrent beams to be applied onto the time and frequency resources so as to take into account a fairness constraint between the wireless receivers in view of effective channel conditions toward the wireless receivers, wherein the wireless transmitter performs a frame transmission onto the time and frequency resources by configuring the analog precoder according to the combinations of concurrent beams determined by the online fair scheduler. The method is such that the wireless transmitter further comprises an offline MU-MIMO fair scheduler implementing a first configuration phase in which the offline MU-MIMO fair scheduler determines candidate combinations of concurrent beams by using long-term statistics associated to performance of transmissions from the wireless transmitter toward the wireless receivers and by taking into account the fairness constraint between the wireless receivers, and the method is such that the online fair scheduler implements a second configuration phase in which the online MU-MIMO fair scheduler selects the combinations of concurrent beams to be applied onto the time and frequency resources among the candidate combinations of concurrent beams determined by the offline MU-MIMO fair scheduler during the first configuration phase. Thus, thanks to the first configuration phase performed by the offline MU-MIMO fair scheduler using the long-term statistics, complexity of effective scheduling operations performed by the online MU-MIMO fair scheduler is reduced since by the online MU-MIMO fair scheduler has only to focus on a reduced set of candidate combinations of concurrent beams.

According to a particular embodiment, the wireless transmitter reinitiates the first configuration phase when receive conditions of the MU-MIMO transmissions have changed compared with a preceding frame transmission. Thus, the candidate combinations of concurrent beams are adequate over time.

According to a particular embodiment, the receive conditions of the MU-MIMO transmissions have changed compared with a preceding frame transmission when at least one of the following conditions is faced: when the long-term statistics of at least one wireless receiver have changed since the preceding frame transmission; when the wireless transmitter has not enough data anymore to be transmitted to at least one wireless receiver since the preceding frame transmission; when the wireless transmitter has received new data to be transmitted to at least one wireless receiver for which there was precedingly not enough data to be transmitted thereto for the preceding frame transmission; when there is a change, since the preceding frame transmission, in the wireless receivers that are active among all the wireless receivers of a transmission system to which the wireless transmitter belongs; and when there is a change, since the preceding frame transmission, in the wireless receivers presence in the transmission system. Thus, adequation of the candidate combinations of concurrent beams over time is reinforced.

According to a particular embodiment: the offline MU-MIMO fair scheduler retains, as candidate combinations of concurrent beams, the combinations of concurrent beams which optimize a first utility function; and the online MU-MIMO fair scheduler retains, as combinations of concurrent beams to be effectively used for transmission onto the time and frequency resources, the combinations of concurrent beams which optimize a second utility function. Moreover, the first utility function and the second utility function diverge in that the first utility function uses the long-term statistics metric values to anticipate potential scheduling result, whereas the second utility function uses the effective channel conditions toward the wireless receivers to decide scheduling to be effectively applied. Thus, relevance of the candidate combinations of concurrent beams can be easily achieved.

According to a particular embodiment, the wireless receivers supposed to be targeted with each one of the candidate combinations of concurrent beams are defined by the offline MU-MIMO fair scheduler during the first configuration phase. Thus, complexity of effective scheduling operations performed by the online MU-MIMO fair scheduler is reduced since wireless receivers grouping is performed offline.

According to a particular embodiment, the wireless receivers effectively addressed with any one of the candidate combinations of concurrent beams are defined by the online MU-MIMO fair scheduler during the second configuration phase. Thus, the online MU-MIMO fair scheduler is able to modify wireless receivers grouping that is inherently performed offline during the first configuration phase.

According to a particular embodiment, the wireless transmitter further comprises a digital precoder placed upstream the set of modulators, and the online MU-MIMO fair scheduler determines and further applies configurations of the digital precoder during the second configuration phase, namely one configuration of the digital precoder for each one of the time and frequency resources. Thus, inter-receiver interference mitigation is achieved on a per time and frequency resource basis.

According to a particular embodiment, the wireless transmitter determines the union of the beam configurations appearing in the candidate combinations of concurrent beams and requests the wireless receivers to feedback Channel State Information (CSI) data related to said beam configurations of the union so as to determine the effective channel conditions toward the wireless receivers. Thus, CSI-feedback overhead is limited.

The present invention also concerns a computer program that can be downloaded from a communication network and/or stored on a non-transitory information storage medium that can be read by a processing device such as a microprocessor. This computer program comprises instructions for causing implementation of the aforementioned method, when said program is run by the processing device. The present invention also concerns a non-transitory information storage medium, storing such a computer program.

The present invention also concerns a wireless transmitter comprising a massive transmit antennas arrangement, a set of modulators and an analog precoder mixing modulated analog signals output by the set of modulators onto respective inputs of the massive transmit antennas arrangement, the wireless transmitter further comprising a codebook storing candidate predefined beam configurations corresponding to a specific phase pattern configuration of the analog precoder, transmissions of frames by the wireless transmitter being performed onto respective time and frequency resources by using combinations of concurrent beam configurations among the candidate predefined beam configurations stored in the codebook so as to perform Multi-User Multiple-Inputs Multiple-Outputs MU-MIMO transmissions toward wireless receivers. In addition, the wireless transmitter further comprises an online fair scheduler determining which combinations of concurrent beams to be applied onto the time and frequency resources so as to take into account a fairness constraint between the wireless receivers in view of effective channel conditions toward the wireless receivers, wherein the wireless transmitter further comprises means for performing a frame transmission onto the time and frequency resources by configuring the analog precoder according to the combinations of concurrent beams determined by the online fair scheduler. Moreover, the wireless transmitter further comprises an offline MU-MIMO fair scheduler implementing a first configuration phase in which the offline MU-MIMO fair scheduler is configured to determine candidate combinations of concurrent beams by using long-term statistics associated to performance of transmissions from the wireless transmitter toward the wireless receivers and by taking into account the fairness constraint between the wireless receivers, and the online fair scheduler implements a second configuration phase in which the online MU-MIMO fair scheduler is configured to select the combinations of concurrent beams to be applied onto the time and frequency resources among the candidate combinations of concurrent beams determined by the offline MU-MIMO fair scheduler during the first configuration phase.

The characteristics of the invention will emerge more clearly from a reading of the following description of at least one example of embodiment, said description being produced with reference to the accompanying drawings.

DESCRIPTION OF EMBODIMENTS

Figure 1:
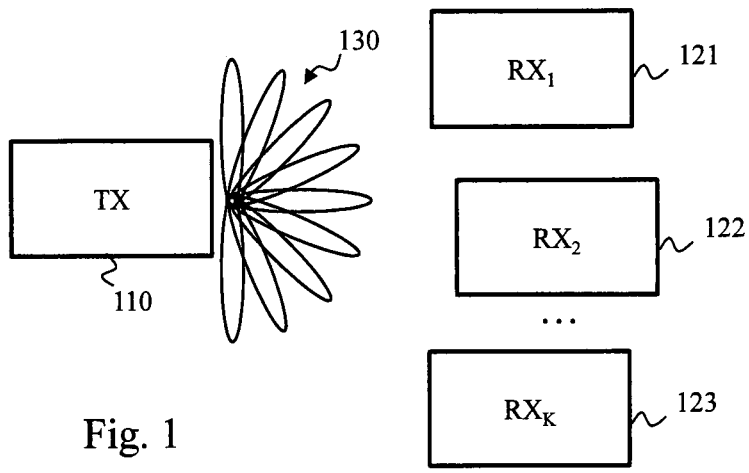
FIG. 1 schematically represents a transmission system in which the present invention may be implemented.

FIG. 1 schematically represents a transmission system in which the present invention may be implemented. The transmission system comprises a wireless transmitter TX 110 and a plurality of Ktot (Ktot>1) wireless receivers $RX_1$ 121, $RX_2$ 122, ..., $RX_{Ktot}$ 123 toward which the transmitter TX 110 transmits frames. The wireless transmitter TX 110 uses beamforming 130, which is a signal processing technique used with transmit antennas arrays for directional signal transmission in such a way that signals in particular transmission directions experience constructive interference while signals in other transmission directions experience destructive interference. The wireless transmitter TX 110 is for example a base station and the wireless receivers $RX_1$ 121, $RX_2$ 122, ..., $RX_{Ktot}$ 123 are mobile terminals.

Figure 2:
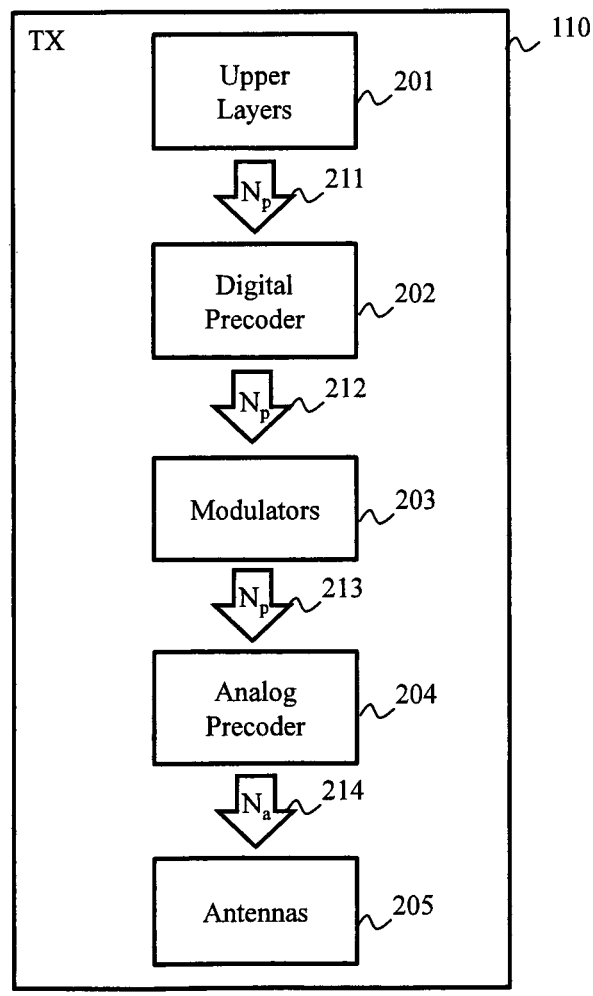
FIG. 2 schematically represents a wireless transmitter of the transmission system.

To do so, as schematically depicted in FIG. 2, the wireless transmitter TX 110 comprises a massive transmit antennas arrangement 205, for example consisting of an array of Na=2048 or 4096 transmit antennas. The wireless transmitter TX 110 further comprises an analog precoder 204 and a set of Np modulators 203. The wireless transmitter TX 110 optionally further comprises a digital precoder 202.

Na analog signals 214 are input to the massive transmit antennas arrangement 205 from the analog precoder 204. The analog precoder 204 mixes Np modulated analog signals 213 onto the Na inputs of the massive transmit antennas arrangement 205. The analog precoder 204 duplicates each one of the Np modulated analog signals 213 into Na copies thereof, performs a phase rotation of each signal copy, routes each phase-rotated signal copy to one transmit antenna input, and sums all rotated signal copies arriving at each transmit antenna input, thus generating Np equivalent beams (one beam for each one of the Np modulated analog signals 213).

The Np modulated analog signals 213 are generated by the set of Np modulators 203 from respective Np digital signals 212. Each modulator comprises a baseband unit, adapted for example to generate an OFDM (Orthogonal Frequency Division Multiplex) baseband signal and a radio frequency circuit that transposes the baseband signal around a carrier frequency. The input of a modulator 203 is typically a set of symbols, each symbol being associated to one time and frequency resource defined by the baseband signal. For example, when considering an OFDM baseband signal, the time and frequency resources are defined by the subcarriers of the OFDM modulation during a predefined time slot.

The digital precoder 202 is placed upstream the analog precoder 204, and more particularly upstream the set of Np modulators 203. The digital precoder 202 spatially mixes Np symbols 211 addressed to Np≤Ktot co-scheduled wireless receivers among the Ktot wireless receivers $RX_1$ 121, $RX_2$ 122, ..., $RX_{Ktot}$ 123, so as to generate the aforementioned Np digital signals 212. The Np symbols 211 are provided by upper layers 201 within a transmission protocol stack of the wireless transmitter TX 110. For example, one of the symbol targets a given wireless receiver, and is a QAM (Quadrature Amplitude Modulation) symbol carrying coded bits belonging to a codeword of an error correcting code associated with an information word, said information word resulting from a segmentation of data present in a buffer associated with said wireless receiver and stored in the wireless transmitter TX 110. The integer Np thus represents a quantity of simultaneous spatial streams, which is, for simplicity purpose, assumed equal to the quantity of wireless receivers simultaneously (i.e. at the same time) served by the wireless transmitter TX 110. In other words, when plural spatial streams are intended to be delivered to a single wireless receiver, it is equivalent as delivering said spatial streams to distinct wireless receivers with identical transmission channel characteristics. Moreover, since the Np spatial streams can be attributed to different wireless receivers from one frame to another, the wireless transmitter TX 110 keeps track of a mapping between the Np spatial streams for each frame and the wireless receivers targeted by said spatial streams for said frame.

When the digital precoder 202 is omitted, the Np symbols 211 are directly input to the set of Np modulators 203.

It can be noted that the generated beams are wideband, which means that equivalent antenna gain observed by any wireless receiver is identical over the whole transmission band. Thus, the configuration of the analog precoder 204 cannot be changed across the frequency domain, contrary to the configuration of the digital precoder 202, which can be computed independently from one subcarrier (or group of subcarriers) to another in a multicarrier transmission system (e.g. OFDM) context.

Figure 3:
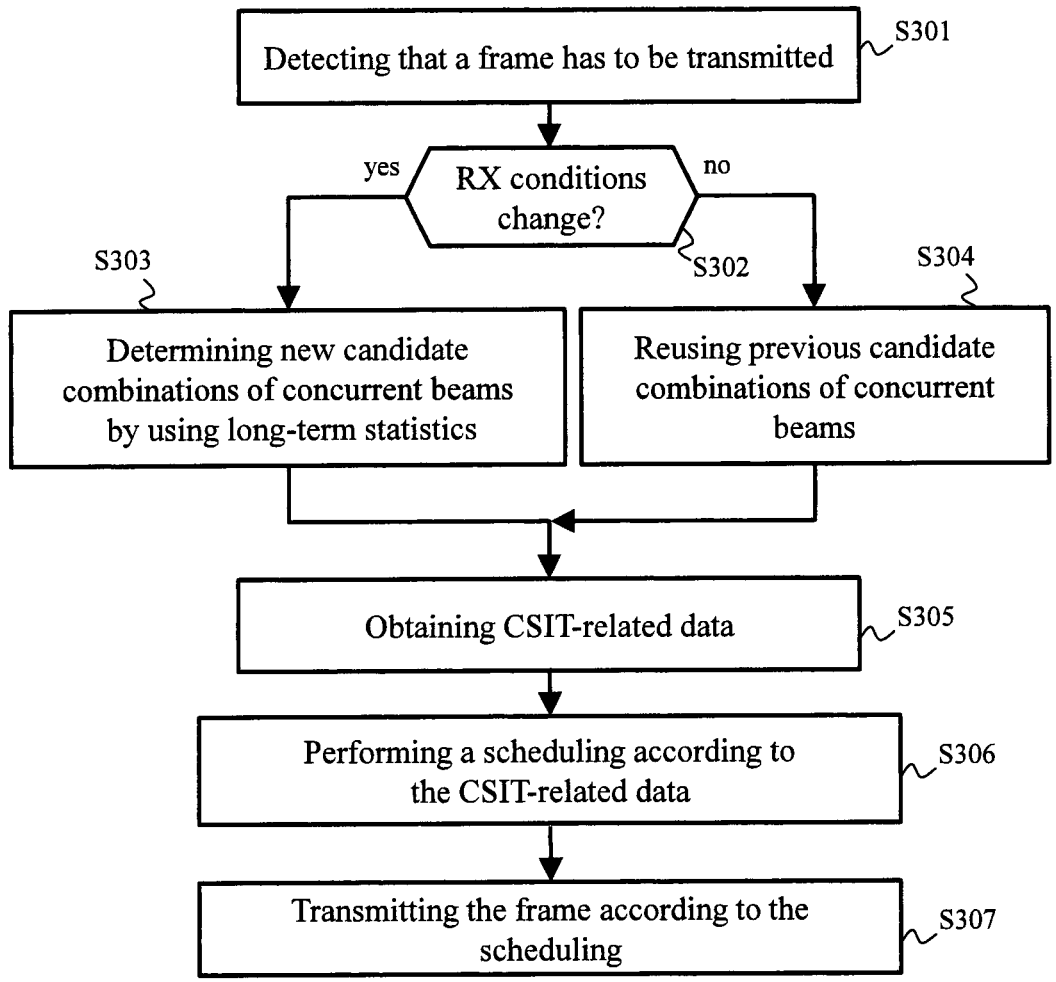
FIG. 3 schematically represents an algorithm for configuring the wireless transmitter for transmitting a frame toward a plurality of wireless receivers.

FIG. 3 schematically represents an algorithm for configuring the wireless transmitter TX 110 for transmitting a frame toward Np wireless receivers.

In a step S301, the wireless transmitter TX 110 detects that data has to be transmitted toward at least one of the Ktot wireless receivers. Said data has to be included in a frame. The frame has to be transmitted on several time and frequency resources, which are usually called Physical Resource Blocks (PRB) in 3GPP LTE-based systems. For example, each time and frequency resource contains 12 contiguous subcarriers across 7 contiguous OFDM symbols in a given time slot, and a 20 MHz wideband contains 100 PRBs in the frequency domain. It is considered herein that one frame is transmitted over M time and frequency resources, which have to be appropriately selected by the wireless transmitter TX 110 as described hereafter. As a result, it is considered that data addressed to Np different wireless receivers can be spatially multiplexed on each time and frequency resource, and that the wireless receivers served on two different time and frequency resources might be different.

In a step S302, the wireless transmitter TX 110 checks whether or not receive conditions have changed compared with a preceding frame transmission. In other words, the wireless transmitter TX 110 checks whether the situation of at least one of the wireless receivers of the transmission system has changed. The situation of at least one wireless receiver is said to have changed when long-term statistics, considered herein to determine candidate combinations of concurrent beams which can be applied for transmitting a frame (i.e. among which selection has to be made), have changed since the last frame transmission. In another case, the situation of at least one wireless receiver is said to have changed when the wireless transmitter TX 110 has not enough data anymore to be transmitted thereto (getting below a predefined threshold), or when the wireless transmitter TX 110 has received new data to be transmitted thereto whereas there was precedingly not enough data to be transmitted thereto (getting above the predefined threshold). A particular embodiment for determining whether receive conditions have changed compared with said preceding frame transmission is detailed hereafter with respect to FIG. 4. In a particular embodiment, the wireless transmitter TX 110 is able to determine which wireless receivers $ARX_1$, $ARX_2, \ldots, ARX_K$ are active in the transmission system (a change in the wireless receivers active in the transmission system can be considered as a change in the receive conditions) among the Ktot wireless receivers.

When the receive conditions have changed, a step S303 is performed; otherwise, a step S304 is performed.

In the step S303, the wireless transmitter TX 110 determines new candidate combinations of concurrent beams which can be applied for transmitting the frame. The candidate combinations of concurrent beams are obtained by an offline MU-MIMO fair scheduler using long-term statistics associated to the wireless receivers to be served, so as to take into account a fairness constraint between the wireless receivers. This represents a first configuration phase.

The long-term statistics are representative of statistical performance of wireless transmissions from the wireless transmitter TX 110 to the K active wireless receivers $ARX_1$, $ARX_2, \ldots, ARX_K$ over time. The long-term statistics are in particular SINR and covariance matrices resulting from observations made by the K active wireless receiver $ARX_1$, $ARX_2, \ldots, ARX_K$ over time during transmissions performed by the wireless transmitter TX 110. This approach allows selecting a subset of predefined possible combinations of concurrent beams which actually fits with the transmission channel situations statistically experienced by the active wireless receivers $ARX_1, ARX_2, \ldots, ARX_K$. However, this does not accurately take into account channel realization and capability of the digital precoder 202 (when present) to mitigate inter-receiver interference. This is performed in a second configuration phase implemented by an online MU-MIMO fair scheduler, as described hereafter.

It has to be noted that the more the transmission channel is stable with respect to fading realization, the closer the transmission system effective performance to the performance predicted by the long-term statistics. Combination of millimeter waveband and massive antennas MIMO approach provides a quite good stability to fading realization (thanks to narrow concurrent beams and multiple antennas). Particular embodiments for determining appropriate candidate combinations of concurrent beams from the long-term statistics are detailed hereafter with respect to FIGS. 5 and 6. Then a step S305 is performed.

In the step S304, the wireless transmitter TX 110 reuses the candidate combinations of concurrent beams used for said preceding frame transmission, since the receive conditions remain substantially the same and no impact has been observed on the long-term statistics. Then the step S305 is performed.

In the step S305, the wireless transmitter TX 110 obtain CSIT (Channel State Information at Transmitter)-related data. The CSIT-related data are derived from CSI (Channel State Information) fed back by the active wireless receivers $ARX_1, ARX_2, \ldots, ARX_K$ to the transmitter TX 110. The CSIT-related data provide a representation of actual transmission channels between the wireless transmitter TX 110 and the Np wireless receivers to be served. Building CSIT-related data from CSI fed back by wireless receivers is widely addressed in the prior art. A particular embodiment for gathering CSI is detailed hereafter with respect to FIG. 9.

In a step S306, the wireless transmitter TX 110 performs a scheduling according to the CSIT-related data obtained in the step S305 and according to the candidate combinations of concurrent beams resulting from the step S303 or S304. The wireless transmitter TX 110 can compute, for each time and frequency resource to be used to transmit the frame, a multi-user scheduling metric value for each one of said candidate combinations of concurrent beams, and then select the candidate combination of concurrent beams to be effectively applied for said time and frequency resource, as well as group of addressed wireless receivers, and optionally digital precoder configuration, so as to optimize the multi-user scheduling metric. To do so, the wireless transmitter TX 110 implements an online MU-MIMO fair scheduler. Particular embodiments for performing adequate scheduling are detailed hereafter with respect to FIGS. 7 and 8.

In a step S307, the wireless transmitter TX 110 builds the frame and transmits, on the time and frequency resources that were identified to be used to transmit the frame, the built frame according to the combination of concurrent beams, group of targeted wireless receivers, and optionally digital precoder configuration, which result from the scheduling performed in the step S306.

It has to be noted that, in the case where more time and frequency resources for transmitting the frame are available compared with the quantity of data to be effectively transferred, redundancy can be introduced so as to fill up said time and frequency resources.

Figure 4:
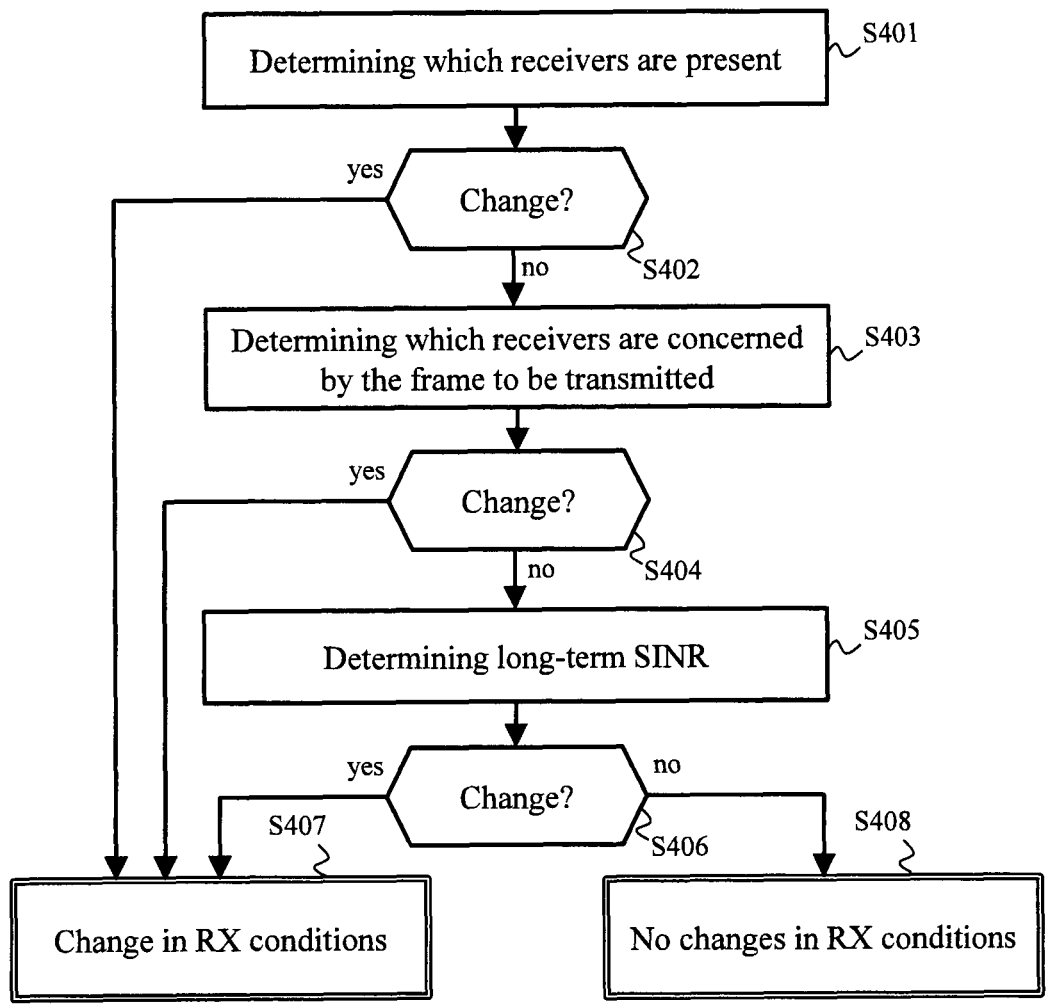
FIG. 4 schematically represents an algorithm for deciding whether candidate combinations of concurrent beams have to be updated for transmitting the frame toward the plurality of wireless receivers, in a particular embodiment.

FIG. 4 schematically represents an algorithm for deciding whether candidate combinations of concurrent beams have to be updated for transmitting a frame toward Np wireless receivers, in a particular embodiment.

In a step S401, the wireless transmitter TX 110 determines which wireless receivers are present in the transmission system. Indeed, a wireless receiver may have been turned on or off, or may have experienced a handover toward another cell.

In a step S402, the wireless transmitter TX 110 checks whether or not there is a change in the wireless receivers presence in the transmission system compared with a preceding frame transmission. When the wireless receivers in the transmission system are the same as previously, a step S403 is performed; otherwise, a step S407 is performed.

In a step S403, the wireless transmitter TX 110 determines which K active wireless receivers $ARX_1, ARX_2, \ldots, ARX_K$ among the Ktot wireless receivers are concerned by the frame to be transmitted. In a particular embodiment, activity of each wireless receiver is monitored. When a wireless receiver has activity below a predefined threshold, the wireless transmitter TX 110 may consider that said wireless receiver is not concerned by the frame to be transmitted. For example, such activity monitoring is implemented through data buffers filing rate monitoring. At least one data buffer in the wireless transmitter TX 110 is associated with each wireless receiver $RX_1$ 121, $RX_2$ 122, ..., $RX_{Ktot}$ 123, for instance at application layer and/or at transport layer. When the filing rate of such a data buffer is below a predefined threshold, the wireless transmitter TX 110 considers that the wireless receiver $RX_1$ 121, $RX_2$ 122, ..., $RX_{Ktot}$ 123 associated with said data buffer is not concerned by the frame to be transmitted. Thus, only the wireless receivers which data buffer filling rate is above a predefined threshold belong to the set of active wireless receivers $ARX_1$, $ARX_2$, ..., $ARX_K$. In a particular embodiment, in a manner complementary to the above approach, when the average data throughput on a given time window, which is typically much longer than a frame time duration, associated with a given wireless receiver is below a given threshold, said wireless receiver is considered as inactive.

In a step S404, the wireless transmitter TX 110 checks whether or not there is a change in the K active wireless receivers concerned by the frame to be transmitted compared with said preceding frame transmission. When the K active wireless receivers concerned by the frame to be transmitted are the same as previously, a step S405 is performed; otherwise, the step S407 is performed.

In a step S405, the wireless transmitter TX 110 determines whether long-term statistics, related to each one of the K active wireless receiver which was already present in the transmission system when said preceding frame transmission has occurred, have changed since said preceding frame transmission. As already mentioned, the long-term statistics are SINR and covariance matrices resulting from observations made by the active wireless receivers $ARX_1$, $ARX_2$, ..., $ARX_K$ over time during transmissions performed by the wireless transmitter TX 110. Such long-term statistics are computed from noise power observed by the active wireless receivers $ARX_1$, $ARX_2$, ..., $ARX_K$, and averaged wideband power observed by the active wireless receivers $ARX_1$, $ARX_2$, ..., $ARX_K$ from the wireless transmitter TX 110 and from any other interfering transmitter (such as another base station).

In a step S406, the wireless transmitter TX 110 checks whether or not the long-term statistics have changed. When the long-term statistics have changed, the step S407 is performed; otherwise, a step S408 is performed.

In the step S407, the wireless transmitter TX 110 considers that the receive conditions have changed compared with said preceding frame transmission, and thus the candidate combinations of concurrent beams shall be re-processed.

In the step S408, the wireless transmitter TX 110 considers that the receive conditions have not changed compared with said preceding frame transmission, and thus preceding candidate combinations of concurrent beams can be re-used.

Figure 5:
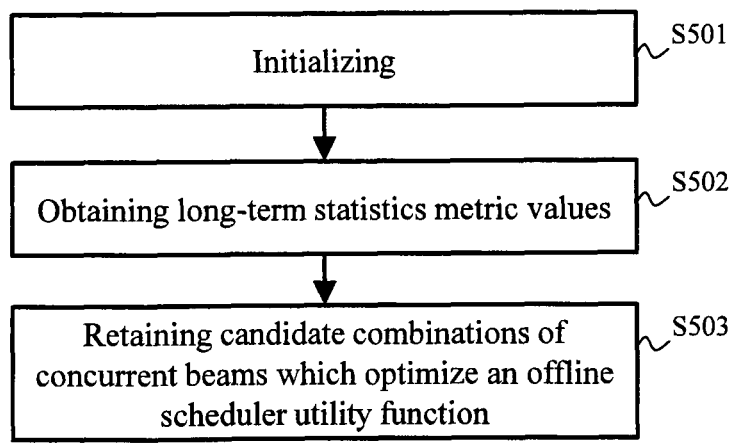
FIG. 5 schematically represents an algorithm for determining the candidate combinations of concurrent beams which can be applied for transmitting the frame toward the plurality of wireless receivers.

FIG. 5 schematically represents an algorithm for determining the candidate combinations of concurrent beams which can be applied for transmitting a frame toward Np wireless receivers.

At this point, it is considered that the wireless transmitter TX 110 has identified the K wireless receivers that are supposed to be active in the transmission system for the frame transmission to be considered. The active wireless receivers $ARX_1$, $ARX_2$, ..., $ARX_K$ are indexed from 1 to K. The goal of the algorithm of FIG. 5 is to select Nc candidate combinations C(1), ..., C(Nc) of concurrent beams built from Nb=Na candidate predefined beam configurations that can be concurrently used (i.e. combined) and that are stored in a codebook CB of the wireless transmitter TX 110. Each candidate predefined beam configuration stored in the codebook CB corresponds to a specific phase pattern configuration of the analog precoder 204. The selected Nc candidate combinations of concurrent beams are then further used as a basis for appropriately grouping the wireless receivers in the scheduling process, either in the first configuration phase or in the second configuration phase, as detailed hereafter.

One main challenge of MU-MIMO transmissions relates to group creation, i.e. deciding which wireless receivers should be grouped together on the same time and frequency resource(s). Indeed, dynamically building groups according to a fairness constraint usually requires too large scheduling processing complexity. Complexity is further increased by an additional degree of freedom provided by the variety of possible combinations of concurrent beams which can be selected for each frame transmission. Thus, it is proposed to semi-statically select the Nc candidate combinations C(1), ..., C(Nc) of concurrent beams using the aforementioned long-term statistics, in a manner compliant with the fairness constraint.

In a step S501, the wireless transmitter TX 110 performs initialization. Initialization consists in assigning default values to temporary parameters used for determining the adequate candidate combinations of concurrent beams. In particular, an index Cidx is set to "1", and a theoretical average rate parameter Rav1(j) is set to "0", wherein j is an index such that $0<j<K+1$. Alternatively, the theoretical average rate parameter Rav1(j) is initialized with a value corresponding to the theoretical average rate achieved so far for the active wireless receiver $ARX_1$, $ARX_2$, ..., $ARX_K$ identified by the index j, or with a value corresponding to an effective total or average rate achieved so far for the active wireless receiver $ARX_1$, $ARX_2$, ..., $ARX_K$ identified by the index j, (see parameter Rav2(j) hereafter).

In a step S502, the wireless transmitter TX 110 obtains long-term statistics metric values for each one of the K wireless receivers active in the transmission system and for each one of the Nb candidate beam configurations stored in the codebook CB. The wireless transmitter TX 110 thus obtains a value of a metric of long-term transmission performance associated with transmission from the wireless transmitter TX 110 to each one of said K active wireless receivers $ARX_1$, $ARX_2$, ..., $ARX_K$ via each one of said Nb candidate beam configurations that can be used concurrently.

The long-term statistics metric is for example Shannon capacity $\log_2(1+SINR)$ based on long-term SINR computed from useful signal power received through the candidate beam configuration in question, and average interference power received from any potential interfering transmitter (such as neighboring base stations), and noise level. These power values are computed by the wireless receiver in question and periodically fed back to the wireless transmitter TX 110. The data rate required for such a feedback has no significant impact on performance of transmissions from the wireless receiver in question since periodicity of feedback is in general large and corresponding amount of fed back data is rather low. Such a long-term statistics metric ignores intra-cell interference, i.e. the fact that other wireless receivers may be using beam configurations that may generate interference. Intra-cell interference can be managed by appropriately configuring the digital precoder 202 during the second configuration phase implemented by the online MU-MIMO fair scheduler. The long-term statistics metric may however take into account long-term intra-cell interference, as measured by the wireless receiver in question and fed back to wireless transmitter TX 110. Such long-term intra-cell interference may then be added to inter-cell interference in order to refine SINR values.

In a variant, the long-term statistics metric values are for example extracted from a look-up table (LUT) providing association of system rate with long term SINR. Such a look-up table is pre-computed from different transmission modes including several modulation schemes, such as QAM schemes, and error correcting code rates.

In a step S503, the wireless transmitter TX 110 retains, as candidate combinations of concurrent beams, the combinations of concurrent beams which optimize a utility function (as known as figure of merit) of the offline MU-MIMO fair scheduler. The utility function of the offline MU-MIMO fair scheduler aims at taking into account by anticipation a fairness criterion intended to be applied in the scope of a utility function of the online MU-MIMO fair scheduler during the second configuration phase. The utility function of the offline MU-MIMO fair scheduler and the utility function of the online MU-MIMO fair scheduler diverge in that the utility function of the offline MU-MIMO fair scheduler uses the long-term statistics metric values to anticipate potential scheduling result, whereas the utility function of the online MU-MIMO fair scheduler uses effective channel conditions to decide scheduling to be effectively applied.

The offline MU-MIMO fair scheduler optimizes for example an alpha-fair criterion, which leads to the following utility function, wherein the Np beam configurations showing the best long-term statistics metric values have been retained beforehand for each wireless receiver:

$$\sum_{p=1}^{Np} \frac{UEBC(P(p, Cidx), U(p, Cidx))}{Rav1(U(p, Cidx))^{\alpha}}$$

wherein $\alpha$ is a fairness coefficient such that $-\infty < \alpha < +\infty$, wherein UEBC(P(p,Cidx), U(p,Cidx)) represents the long-term statistics metric value for the beam configuration identified by P(p, Cidx) and for the wireless receiver identified by U(p, Cidx). The denotation P(p, Cidx) shall be understood as an (absolute) identifier of the beam configuration represented by the value of the relative index p among the concurrent beams forming the combination of concurrent beams represented by the value of the index Cidx. In addition, the denotation U(p,Cidx) shall be understood as an (absolute) identifier of the wireless receiver associated with the beam configuration represented by the value of the relative index p among the concurrent beams forming the combination of concurrent beams represented by the value of the index Cidx.

One should note that the average rate parameter Rav1(j) is said to be "theoretical" since the offline MU-MIMO fair scheduler operates on estimations based on the long-term statistics metric values and not on effective CSI-data.

The result of the optimization provides the Nc candidate combinations C(1), . . . , C(Nc) of concurrent beams which provide the Nc best values (i.e. highest values, when relying on the utility function expressed above) of the utility function, in association with the Np wireless receivers among said K active wireless receivers ARX$_1$, ARX$_2$, . . . , ARX$_K$, as well as the Np corresponding respective concurrent beam configurations, which optimize the utility function.

In order to unambiguously identify the beam configurations used to build each combination of concurrent beams which have been indexed by the values of the index Cidx from 1 to Nc, the wireless transmitter TX 110 needs to retrieve beam configuration identifier values which are absolute among the Nb beam configurations stored in the codebook CB. Indeed, the index p identifies beam configurations only in a relative manner. The wireless transmitter TX 110 thus retrieves, for each candidate combination C(1), . . . , C(Nc) of concurrent beams, the effective beam configurations B(p, Cidx) used at each port p out of the Np concurrently used in said combination of concurrent beams. The denotation B(p,Cidx) shall be understood as an (absolute) identifier of the beam configuration, among the Nb beam configurations stored in the codebook CB, represented by the value of the relative index p among the concurrent beams forming the combination of concurrent beams represented by the value of the index Cidx. B(p, Cidx) is thus defined as follows:

$$B(p, Cidx) = UEBI(P(p, Cidx), U(p, Cidx))$$

wherein UEBI is an index mapping function such that UEBI(P(p,Cidx),U(p,Cidx)) represents the effective beam index (absolute index) among the Nb beam configurations stored in the codebook CB of the beam configuration P(p, Cidx) associated with the wireless receiver U(p, Cidx).

In a first approach, the optimization is performed by randomly selecting pairs of wireless receivers and beams configurations, and by retaining the Np ones providing the best result of the utility function.

Figure 6:
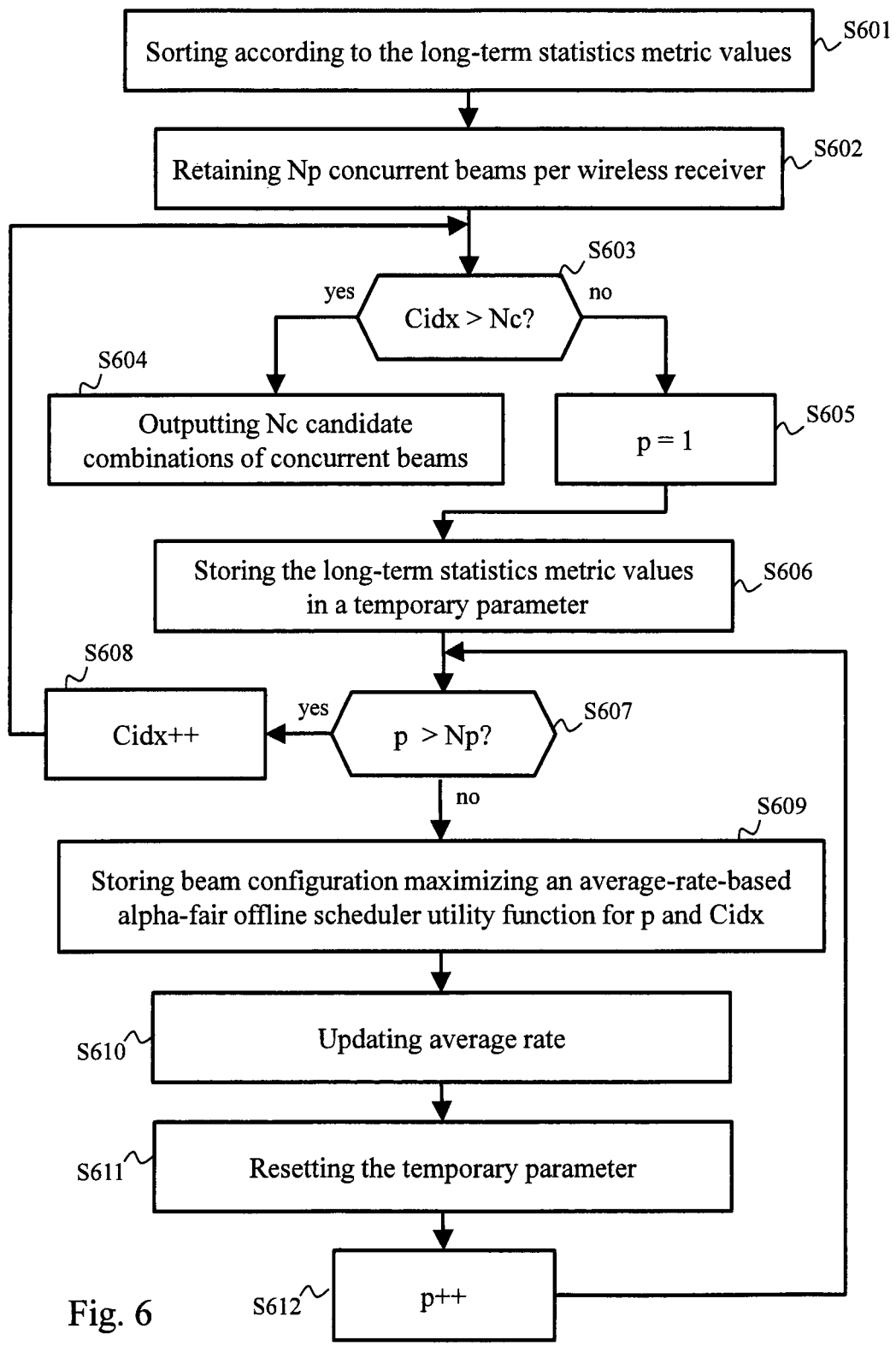
FIG. 6 schematically represents an algorithm for determining the candidate combinations of concurrent beams which can be applied for transmitting the frame toward the plurality of wireless receivers, in a particular embodiment.

In a second approach, the optimization is performed by executing the algorithm described hereafter with respect to FIG. 6.

At the end of the algorithm of FIG. 5, the wireless transmitter TX 110 ends the first configuration phase. The wireless transmitter TX 110 has thus selected the Nc candidate combinations C(1), . . . , C(Nc) of concurrent beams which can be used for performing the effective scheduling in the second configuration phase and corresponding transmission of at least one frame. It shall by the way be noted that the candidate combinations C(1), . . . , C(Nc) therefore consist of respective distinct sets of absolute identifiers B(p, Cidx) as defined above.

In a first embodiment, the Np wireless receivers supposed to be targeted with each one of the Nc candidate combinations C(1), . . . , C(Nc) of concurrent beams are defined by the offline MU-MIMO fair scheduler during the first configuration phase. In a second embodiment, the Np wireless receivers effectively addressed with any one of the Nc candidate combinations C(1), . . . , C(Nc) of concurrent beams are defined by the online MU-MIMO fair scheduler during the second configuration phase. More details are provided hereafter with respect to FIGS. 7 and 8.

FIG. 6 schematically represents an algorithm for determining the candidate combinations of concurrent beams which can be applied for transmitting the frame toward the plurality of wireless receivers, in a particular embodiment. More particularly, the algorithm of FIG. 6 provides an exemplary detailed embodiment of the steps S502 and S503. It is thus considered that, at the beginning of the algorithm of FIG. 6, the initializing step S501 has been performed beforehand.

In a step S601, the wireless transmitter TX 110 sorts, for each wireless receiver among the K active wireless receivers $ARX_1, ARX_2, \ldots, ARX_K$, the Nb beam configurations in performance-decreasing order of the long-term statistics metric values.

In a step S602, the wireless transmitter TX 110 retains, for each wireless receiver among the K active wireless receivers $ARX_1, ARX_2, \ldots, ARX_K$, the top Np beam configurations as sorted in the step S601. It is indeed not needed here to consider more than Np beam configurations per wireless receiver, since Np represents the quantity of beams that can be used concurrently, which means that, in the worst case, any wireless receiver is supposed to be associated with its Np-th worst beam (among all possible concurrent beams described in the codebook CB). At that time, the wireless transmitter TX 110 builds the index mapping function UEBI.

In a step S603, the wireless transmitter TX 110 checks whether or not the value of the index Cidx is greater than Nc. It is reminded that the index Cidx has been initialized to "1" in the step S501. If the value of the index Cidx is greater than Nc, a step S604 is performed; otherwise, a step S605 is performed.

In the step S604, the wireless transmitter TX 110 retrieves, for each combination of concurrent beams which have been indexed by the values of the index Cidx from 1 to Nc, the effective beam configurations B(p, Cidx) used at each port p out of the Np concurrently used in said combination of concurrent beams. Indeed, since in the step S602 only the top Np beam configurations have been retained for each wireless receiver, the index p identifies beam configurations in a relative manner. Therefore, the effective concurrent beams of each candidate combination C(1), ..., C(Nc) shall be identified, in an absolute manner (thanks to the index mapping function UEBI( ) expressed above), so as to accurately define said candidate combination C(1), ..., C(Nc) of concurrent beams and allow appropriately configuring later on the analog precoder 204 during frame transmissions. This ends the algorithm of FIG. 6.

In the step S605, the wireless transmitter TX 110 sets the index p to "1".

In a step S606, the wireless transmitter TX 110 stores the long-term statistics metric values in a temporary parameter m'. In particular, the wireless transmitter TX 110 defines values m'(i,j) of the temporary parameter m' such that $$m'(i,j) = UEBC(i,j),$$

with index i in range [1; Np] and index j in range [1; K].

In a step S607, the wireless transmitter TX 110 checks whether or not the index p is greater than Np. If the index p is greater than Np, a step S608 is performed; otherwise, a step S609 is performed.

In the step S608, the index Cidx is incremented by one unit. In other words, the wireless transmitter TX 110 moves to determining another candidate combination of concurrent beams. Then the step S603 is repeated.

In the step S609, the wireless transmitter TX 110 selects the indexes couple (i',j') maximizing the expression $m'(i',j')/Rav1(j')^\alpha$ and store them as U(p, Cidx)=j' and P(p, Cidx)=i'. In other words, the wireless transmitter TX 110 stores a beam configuration that maximizes an average-rate-based alpha-fair utility function of the offline scheduler for the current values of the index p and the index Cidx.

In a step S610, the wireless transmitter TX 110 updates the average data rate Rav1(j') according to the result of the step S609. In other words, the wireless transmitter TX 110 adds m'(i',j') to the contents of Rav1(j') and stores the result in Rav1(j').

In a step S611, the wireless transmitter TX 110 resets (sets to a null value) the temporary parameter m'(i',j') for the indexes couple (i',j') selected in the step S609. Thus the concerned beam configuration cannot be attributed again to the same wireless receiver.

In a particular embodiment, the same beam configuration cannot be used twice at the same time. Thus, in the step S611, the wireless transmitter TX 110 further finds all the couples of indexes (i",j") such that UEBI(i",j")=UEBI(i',j') and resets (sets to a null value) the temporary parameter m'(i",j").

In another particular embodiment, the quantity of beam configurations that can be allocated to each wireless receiver is upper bounded. The upper bound is for example equal to the quantity of receive antennas of said wireless receiver. In this case, the wireless transmitter TX 110 ensures that the quantity of beam configurations associated with any wireless receiver does not exceed such a predefined upper bound for said wireless receiver. When said upper bound is reached, the wireless transmitter TX 110 resets the temporary parameter m' for said wireless receiver, so that no further beam configuration is selected for said wireless receiver in the candidate combination C(Cidx) under definition.

In a step S612, the wireless transmitter TX 110 increments by one unit the index p. In other words, the wireless transmitter TX 110 moves to determining another beam configuration that would be added to the on-the-way definition of the candidate combination identified by the value of the index Cidx. Then the step S607 is repeated.

Figure 7:
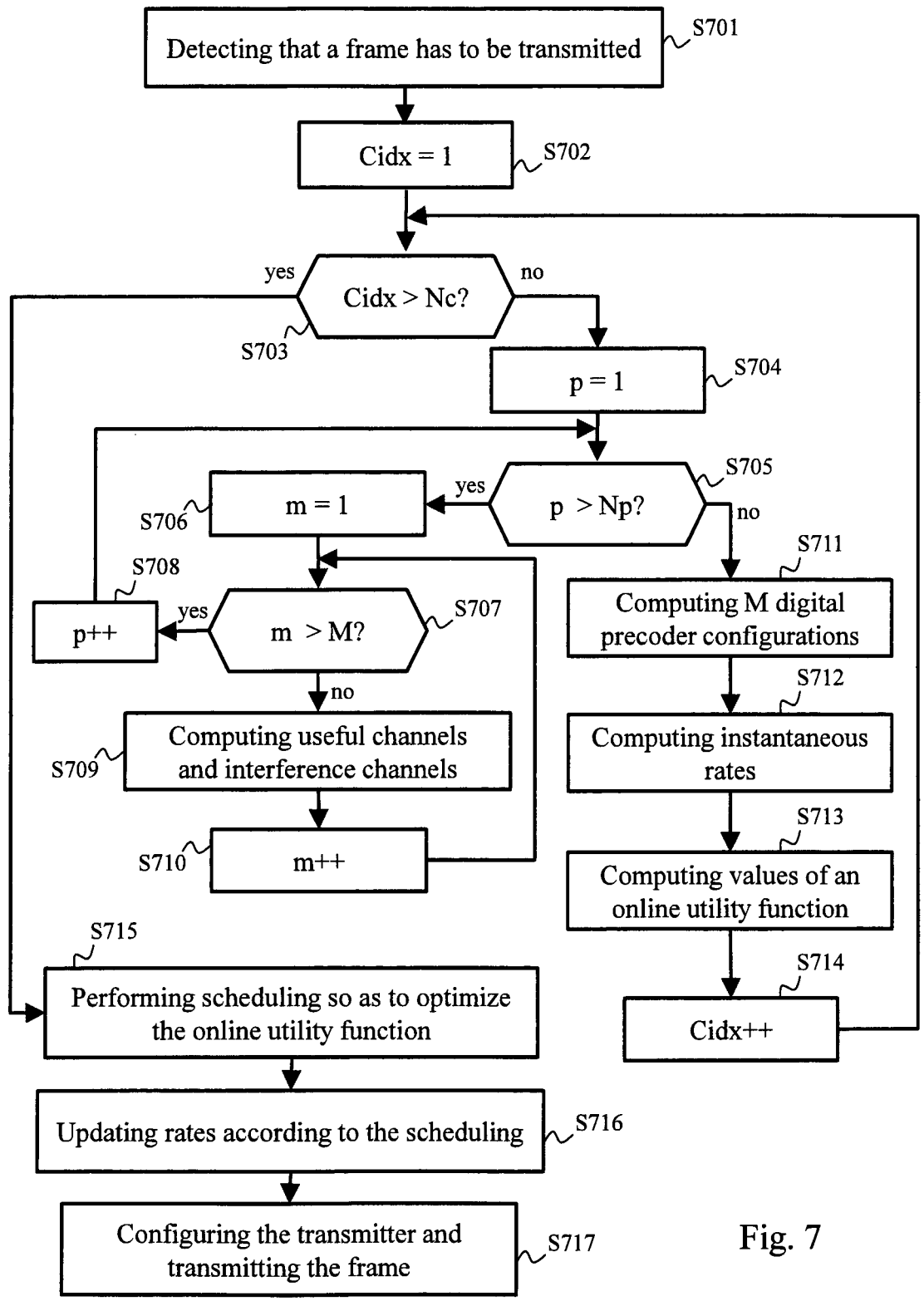
FIG. 7 schematically represents an algorithm for performing scheduling and transmitting the frame toward the plurality of wireless receivers, in a first scheduling particular embodiment.

FIG. 7 schematically represents an algorithm for performing scheduling and transmitting a frame toward the concerned plurality of wireless receivers, in a first scheduling particular embodiment.

In a step S701, the wireless transmitter TX 110 detects that a frame has to be transmitted. This frame shall be processed by the online scheduler.

In a step S702, the wireless transmitter TX 110 sets the index Cidx to "1".

In a step S703, the wireless transmitter TX 110 checks whether or not the index Cidx is greater than Nc. When the index Cidx is greater than Nc, a step S715 is performed; otherwise, a step S704 is performed.

In the step S704, the wireless transmitter TX 110 sets the index p to "1".

In a step S705, the wireless transmitter TX 110 checks whether or not the index p is greater than Np. When the index p is greater than Np, a step S706 is performed; otherwise, a step S711 is performed.

In the step S706, the wireless transmitter TX 110 sets an index m to "1". The index m is used to identify any time and frequency resources among the M time and frequency resources to be used to transmit the frame.

In a step S707, the wireless transmitter TX 110 checks whether or not the value of the index m is greater than M. When the index m is greater than M, a step S708 is performed; otherwise, a step S709 is performed.

In the step S708, the wireless transmitter TX 110 increments the index p by one unit. In other words, the wireless transmitter TX 110 selects the next beam configuration of the candidate combination C(Cidx) of concurrent beams. Then the step S705 is repeated.

In the step S709, the wireless transmitter TX 110 computes useful channels Hu(p,m) of the wireless receiver identified by U(p,Cidx) resulting from the CSIT-related data for the resource identified by the index m, by selecting the channels associated to the beam configuration identified by B(p,Cidx). Moreover, the wireless transmitter TX 110 computes interference channels Hi(p,m) of the wireless receiver identified by U(p,Cidx) resulting from the CSIT-related data, by selecting the channels associated to the beam configurations identified by B(1,Cidx), ..., B(p−1,Cidx), B(p+1, Cidx), ..., B(Np, Cidx), i.e. the beam configuration identified by B(p, Cidx) being excluded.

In the step S710, the wireless transmitter TX 110 increments the index m by one unit. In other words, the wireless transmitter TX 110 considers another time and frequency resource among the M time and frequency resources to be used to transmit the frame. Then the step S707 is repeated.

In the step S711, the wireless transmitter TX 110 optionally computes M configurations of the digital precoder 202 (one configuration for each one of the M time and frequency resources to be used to transmit the frame), from the useful channels Hu(p,m) and interference channels Hi(p,m) computed over the successive iterations of the step S709 for the candidate combination C(Cidx) of concurrent beams.

In a step S712, the wireless transmitter TX 110 computes, and stores, instantaneous rates r(p,Cidx,m) (which means the following set of instantaneous rates r(1,Cidx,m), ..., r(Np,Cidx,m)) expected to be achieved for each one of the Np wireless receivers targeted by the frame over the time and frequency resource m, according to the useful channels Hu(p,m) and optionally to the precoder configurations computed in the step S711. The denotation r(p, Cidx,m) refers herein thus to the instantaneous rate expected to be achieved via the time and frequency resource m among the M time and frequency resources, for the wireless receiver identified by the value of the index p using the candidate combination C(Cidx) of concurrent beams. This instantaneous rate computation is performed for each time and frequency resource m among the M time and frequency resources.

In a step S713, the wireless transmitter TX 110 computes, and stores, values of the online utility function. The online MU-MIMO fair scheduler optimizes for example an alpha-fair criterion, which leads to the following utility function:

$$\sum_{p=1}^{Np} \frac{\sum_{m=1}^{M} r(p, Cidx, m)}{Rav2(U(p, Cidx))^\alpha}$$

wherein Rav2(i) is the effective total rate, or in a variant the effective average rate, achieved for the wireless receiver identified by the index value i from initialization of said total rate Rav2(i) or equivalently from the last re-initialization of said total rate Rav2(i). According to one example, said total rate Rav2(i) is reset when the wireless receiver in question becomes active again (after some period during which said wireless receiver has been inactive or considered as such). According to another example, said total rate Rav2(i) is initialized when the wireless receiver in question is declared in the transmission system (and becomes thus part of the Ktot wireless receivers of the transmission system). According to yet another example, said total rate Rav2(i) is reset periodically, so as to regularly refresh said total rate Rav2(i) and thus get rid of potential computation errors.

In a step S714, the wireless transmitter TX 110 increments the index Cidx by one unit. In other words, the wireless transmitter TX 110 selects another combination of concurrent beams among the candidate combinations C(1), ..., C(Nc) of concurrent beams which were resulting from the first configuration phase implemented by the offline MU-MIMO fair scheduler. Then the step S703 is repeated.

In the step S715, the wireless transmitter TX 110 performs scheduling so as to optimize the online utility function. The wireless transmitter TX 110 retains the candidate combination of concurrent beams among the candidate combinations C(1), ..., C(Nc) which shows the best performance according to the online utility function.

In a step S716, the wireless transmitter TX 110 updates the rates Rav2(i) according to the scheduling decision made in the step S715. The wireless transmitter TX 110 retrieves the wireless receivers U(p, Cidx) for which data are transmitted in the frame in question and updates their respective rates Rav2 in accordance to the made scheduling decision. The other wireless receivers being not served by the frame in question, the wireless transmitter TX 110 updates their respective rates Rav2 in accordance (to take into account that the instantaneous rate for the non-served wireless receivers is null for the frame in question).

In a step S717, the wireless transmitter TX 110 configures itself according to the combination of beam configurations resulting from the step S715 and transmits the frame over the M time and frequency resources accordingly.

In view of the algorithm of FIG. 7, the same group of wireless receivers is selected for the whole band since the beam configurations identified by B(1,Cidx), ..., B(Np,Cidx) and the wireless receivers identified by U(1, Cidx), ..., U(Np, Cidx) are wideband. Thus, the online MU-MIMO fair scheduler is working in the time domain only, which limits flexibility of the scheduling process. Another approach is to not take into account the group of wireless receivers as proposed at the end of first configuration phase implemented by the offline MU-MIMO fair scheduler. This aspect is detailed with respect to FIG. 8 hereafter.

Figure 8:
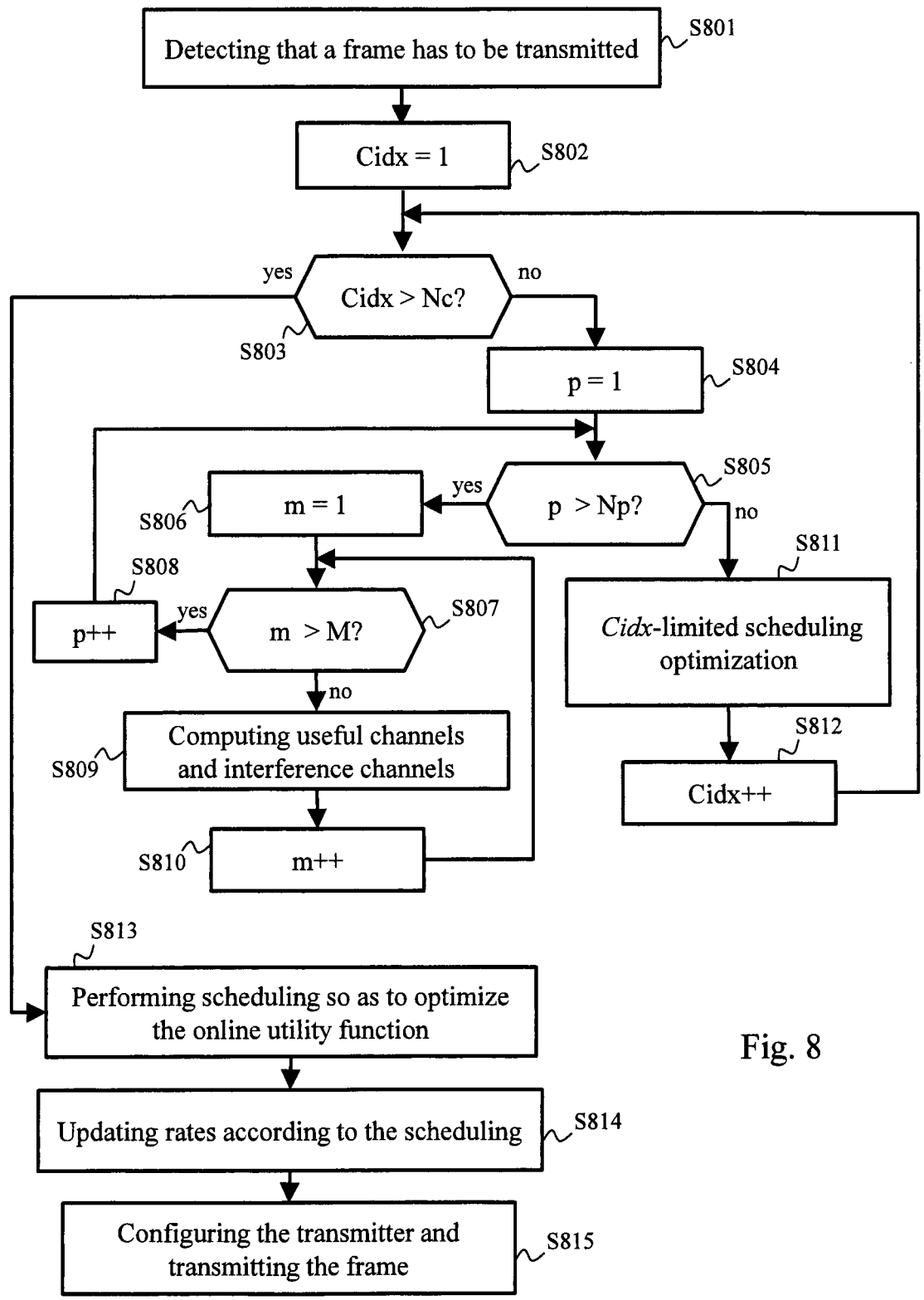
FIG. 8 schematically represents an algorithm for performing scheduling and transmitting the frame toward the plurality of wireless receivers, in a second scheduling particular embodiment.

FIG. 8 schematically represents an algorithm for performing scheduling and transmitting frame toward the concerned plurality of wireless receivers, in a second scheduling particular embodiment.

In a step S801, the wireless transmitter TX 110 detects that a frame has to be transmitted. This frame shall be processed by the online scheduler.

In a step S802, the wireless transmitter TX 110 sets the index Cidx to "1".

In a step S803, the wireless transmitter TX 110 checks whether or not the index Cidx is greater than Nc. When the index Cidx is greater than Nc, a step S813 is performed; otherwise, a step S804 is performed.

In the step S804, the wireless transmitter TX 110 sets the index p to "1".

In a step S805, the wireless transmitter TX 110 checks whether or not the index p is greater than Np. When the index p is greater than Np, a step S806 is performed; otherwise, a step S811 is performed.

In the step S806, the wireless transmitter TX 110 sets an index m to "1". The index m is used to identify any time and frequency resources among the M time and frequency resources to be used to transmit the frame.

In a step S807, the wireless transmitter TX 110 checks whether or not the value of the index m is greater than M. When the index m is greater than M, a step S808 is performed; otherwise, a step S809 is performed.

In the step S808, the wireless transmitter TX 110 increments the index p by one unit. In other words, the wireless transmitter TX 110 selects the next beam configuration of the candidate combination C(Cidx) of concurrent beams. Then the step S805 is repeated.

In the step S809, the wireless transmitter TX 110 computes useful channels Hu(p,m,1), ... Hu(p,m,K) respectively of the K active wireless receivers $ARX_1$, $ARX_2$, ..., $ARX_K$. Said useful channels result from the CSIT-related data for the time and frequency resource identified by the index m, by selecting the channels associated to the beam configuration identified by B(p, Cidx). Moreover, the wireless transmitter TX 110 computes interference channels Hi(p,m,1), ..., Hi(p,m,K) of the K active wireless receivers. Said interference channels result also from the CSIT-related data, by selecting the channels associated with the beam configurations identified by B(1,Cidx), ..., B(p−1, Cidx), B(p+1, Cidx), ..., B(Np, Cidx). Comparatively with the step S709, the association between the beams configurations and the targeted wireless receivers is not fixed in the scope of the algorithm of FIG. 8 (contrary to the scope of the algorithm of FIG. 7). This explains why the useful channels Hu(p,m,1), ... Hu(p,m,K) and interference channels Hi(p,m,1), ..., Hi(p,m,K) are determined here for each one of the K active wireless receivers $ARX_1, ARX_2, \ldots, ARX_K$.

In the step S810, the wireless transmitter TX 110 increments the index m by one unit. In other words, the wireless transmitter TX 110 considers another time and frequency resource among the M time and frequency resources to be used to transmit the frame. Then the step S807 is repeated.

In the step S811, the wireless transmitter TX 110 performs an online MU-MIMO scheduling estimation for the selected candidate combination C(Cidx) of concurrent beams. It is referred to online MU-MIMO scheduling "estimation" here, since no MU-MIMO scheduling decision is made in the step S811. Indeed, the wireless transmitter TX 110 performs optimization only for the selected candidate combination C(Cidx) of concurrent beams at this step. Decision about the candidate combination C(1), ..., C(Nc) to be effectively used for transmitting the frame in question is made later on (see step S813 below). It can consequently be considered in other words that the wireless transmitter TX 110 thus performs a Cidx-limited online MU-MIMO scheduling estimation.

The online MU-MIMO scheduling estimation takes as input the useful channels Hu(p,m,1), ... Hu(p,m,K) and interference channels Hi(p,m,1), ..., Hi(p,m,K) computed in the step S809. The online MU-MIMO scheduling estimation further takes as input the rate Rav2(i) for each one of the K active wireless receivers $ARX_1, ARX_2, \ldots, ARX_K$, wherein Rav2(i) is (as already expressed with respect to FIG. 7) the total rate, or in a variant the average rate, achieved for the wireless receiver identified by the index value i from initialization of said total rate Rav2(i) or equivalently from the last re-initialization of said total rate Rav2(i). According to one example, said total rate Rav2(i) is reset when the wireless receiver in question becomes active again (after some period during which said wireless receiver has been inactive or considered as such). According to another example, said total rate Rav2(i) is initialized when the wireless receiver in question is declared in the transmission system (and becomes thus part of the Ktot wireless receivers of the transmission system). According to yet another example, said total rate Rav2(i) is reset periodically, so as to regularly refresh said total rate Rav2(i) and thus get rid of potential computation errors.

The online MU-MIMO scheduling estimation gives as output a set of M sets of Np wireless receivers identified by U'(p, Cidx,1), ..., U'(p, Cidx, M), which optimizes the online utility function. The denotation U'(p, Cidx,m), with m from 1 to M, shall be understood as an (absolute) identifier of the wireless receiver associated with the beam configuration represented by the value of the relative index p among the concurrent beams forming the combination C(Cidx) of concurrent beams when transmitting data over the time and frequency resource m among the M time and frequency resources to be used to transmit the frame in question.

The online MU-MIMO fair scheduler optimizes for example an alpha-fair criterion, which leads to the following utility function:

$$\sum_{p=1}^{Np}\sum_{m=1}^{M}\frac{r'(p, Cidx, m)}{Rav2(U'(p, Cidx, m))^\alpha}$$

where the denotation r'(p, Cidx, m) refers herein thus to the instantaneous rate expected to be achieved via the time and frequency resource m among the M time and frequency resources, for the wireless receiver identified by U'(p, Cidx, m) with the beam configuration B(p,Cidx). The wireless transmitter TX 110 takes into account rate improvement that can be achieved by the digital precoder 202 when present.

According to one example, the step S811 is performed by exhaustively testing all possible sets of wireless receivers mapping to the Np beam configurations constituting the candidate combination C(Cidx) of concurrent beams via each one of the M time and frequency resources to be used for transmitting the frame in question. According to another example, the step S811 is performed by using a random subset of all the possible sets of wireless receivers mapping to the Np beam configurations constituting the candidate combination C(Cidx) of concurrent beams via each one of the M time and frequency resources. According to yet another example, the step S811 is performed by testing over the sets of groups of wireless receivers which were resulting from the offline MU-MIMO scheduler.

In a particular embodiment, the step S811 is performed by defining, time and frequency resource after time and frequency resource (i.e. by performing optimization from time and frequency resource index going from 1 to M) which wireless receivers to be grouped together along with the adequate precoder configuration. For example, this can be achieved as disclosed in the document "*Simplified fair scheduling and antenna selection algorithms for multiuser MIMO orthogonal space-division multiplexing downlink*", Shreeram Sigdel and Witold A Krzymien, IEEE Transactions on Vehicular Technology, vol. 58, issue 3, pp. 1329-1344, March 2009.

Then, the wireless transmitter TX 110 stores the optimized value of the online utility function along with an identification of the wireless receivers U'(p, Cidx, m) targeted by the frame in question in view of the online MU-MIMO scheduling estimation for said candidate combination C(Cidx) of concurrent beams. The wireless transmitter TX 110 further stores the instantaneous rate r'(p, Cidx, m) that would be obtained for each one of said wireless receiver wireless receivers U'(p, Cidx, m) if said candidate combination C(Cidx) of concurrent beams is finally retained by the online MU-MIMO scheduler (see below).

In a step S812, the wireless transmitter TX 110 increments the index Cidx by one unit. In other words, the wireless transmitter TX 110 selects another combination of concurrent beams among the candidate combinations C(1), ..., C(Nc) of concurrent beams which were resulting from the first configuration phase implemented by the offline MU-MIMO fair scheduler. Then the step S803 is repeated.

In the step S813, the wireless transmitter TX 110 performs scheduling so as to optimize the online utility function. The wireless transmitter TX 110 retains the candidate combination C(1), ..., C(Nc) of beam configurations which shows the best performance according to the online utility function.

In a step S814, the wireless transmitter TX 110 updates the rates Rav2(i) according to the scheduling decision made in the step S813. For each value of the index m from 1 to M, the wireless transmitter TX 110 retrieves the wireless receivers U'(p, Cidx, m) for which data are transmitted in the frame in question and updates their respective rates Rav2 in accordance to the made scheduling decision. The other wireless receivers being not served by the frame in question, the wireless transmitter TX 110 updates their respective rates Rav2 in accordance (to take into account that the instantaneous rate for the non-served wireless receivers is null for the frame in question).

In a step S815, the wireless transmitter TX 110 configures itself according to the combination of beam configurations resulting from the step S813 and transmits the frame over the M time and frequency resources accordingly.

Figure 9:
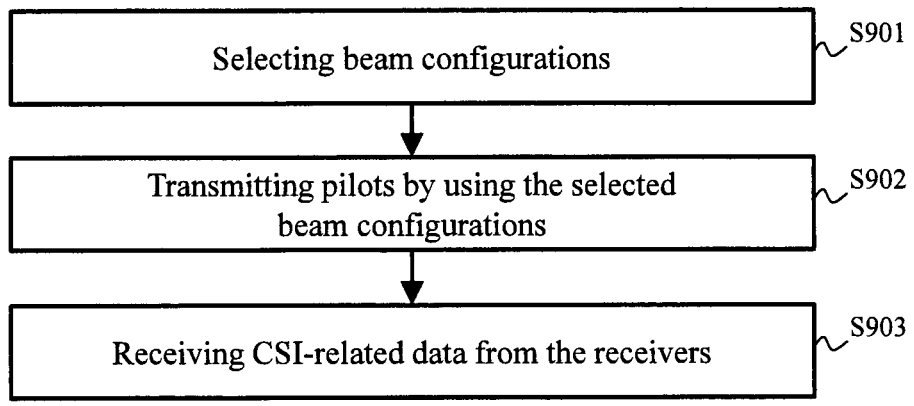
FIG. 9 schematically represents an algorithm for collecting channels observations.

FIG. 9 schematically represents an algorithm for collecting channels observations. Indeed, knowledge by the wireless transmitter TX 110 of the MIMO channels observed by each wireless receiver is needed to build CSIT-related data. Typically, pilot signals are transmitted by the wireless transmitter TX 110, thus allowing each wireless receiver to estimate MIMO channel characteristics.

In a step S901, the wireless transmitter TX 110 selects beam configurations to be used for transmitting the pilot signals toward the wireless receivers.

In practice, not all the MIMO channels need to be known by the wireless transmitter TX 110. Indeed, by considering the candidate combinations C(1), . . . , C(Nc) of concurrent beams, it is highly probable that many of the Nb candidate beam configurations stored in the codebook CB are not present therein. Indeed, for a given spatial distribution of the wireless receivers, some places in the radio coverage area of the wireless transmitter TX 110, and pointed by a given beam configuration, have no active wireless receiver among the active wireless receivers $ARX_1, ARX_2, \ldots, ARX_K$. This involves that such a given beam configuration does not generate neither useful signal nor interference towards the active wireless receivers, and knowledge of corresponding MIMO channels is therefore non-necessary.

Thus, in a first option (inline with the algorithm of FIG. 7), each candidate combination C(1), . . . , C(Nc) of concurrent beams is defined by the offline MU-MIMO scheduler in association with the wireless receivers to be targeted by said candidate combination of concurrent beams. In this case, all the possible MIMO channels for each candidate combination C(1), . . . , C(Nc) of concurrent beams are completely characterized. Thus, it is only required to send pilot signals for any beam configuration used in said candidate combinations C(1), . . . , C(Nc) of concurrent beams. This reduces the quantity of needed pilot signals, which either improves channel estimation or reduces overhead. A CSI feedback is thus obtained by the wireless transmitter TX 110 from the corresponding wireless receivers only on the MIMO channels characterized by the candidate combinations C(1), . . . , C(Nc) of concurrent beams.

Furthermore, two different candidate combinations C(1), . . . , C(Nc) of concurrent beams might have beam configurations in common, not necessarily targeting the same wireless receiver, but resulting in the same MIMO channel. Thus, in order to further limit CSI feedback in a particular embodiment, the wireless transmitter TX 110 determines the union of the beam configurations appearing in the different candidate combinations C(1), . . . , C(Nc) of concurrent beams and requests the wireless receivers to feedback CSI data related to said beam configurations of the union. Then the wireless transmitter TX 110 reassembles CSI-data related to said beam configurations in view of the candidate combinations C(1), . . . , C(Nc) of concurrent beams and is thus able to reconstruct the desired MIMO channels representations.

In a second option (inline with the algorithm of FIG. 8), each candidate combination C(1), . . . , C(Nc) of concurrent beams is defined by the offline MU-MIMO scheduler in association with the wireless receivers to be optionally targeted by said candidate combination C(1), . . . , C(Nc) of concurrent beams from the standpoint of the offline MU-MIMO scheduler. It means that appropriately grouping the wireless receivers can be reviewed by the online MU-MIMO scheduler. In order to do so, and optionally to compute the appropriate digital precoder configuration, the wireless transmitter TX 110 needs to know all the potential MIMO channels that can be used. Thus, a CSI report is required by the wireless transmitter TX 110 from all the wireless receivers for all the beam configurations used in the candidate combinations C(1), . . . , C(Nc) of concurrent beams. Then the wireless transmitter TX 110 is able to reconstruct all the MIMO channels associated with any association of wireless receivers for each candidate combinations C(1), . . . , C(Nc) of concurrent beams.

In a step S902, the wireless transmitter TX 110 transmits pilot signals by using the beam configurations selected in the step S901.

In a step S903, the wireless transmitter TX 110 receives CSI-related data from the concerned wireless receivers.

As a remark, the wireless transmitter TX 110 obtains the CSI-related data for each time and frequency resource m among the M time and frequency resources used to transmit the frame in question by extrapolating the CSI-related data thus received from the wireless receivers.

Figure 10:
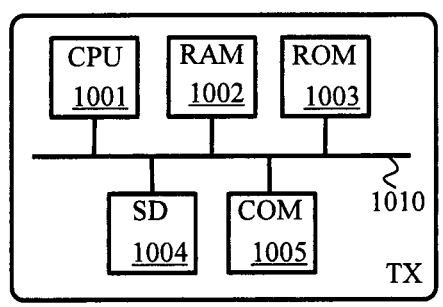
FIG. 10 schematically represents an example hardware architecture of the wireless transmitter.

FIG. 10 schematically represents an example hardware architecture of the wireless transmitter TX 110. According to the shown example of hardware architecture, the wireless transmitter TX 110 comprises at least the following components interconnected by a communications bus 1010: a processor, microprocessor, microcontroller or CPU (Central Processing Unit) 1001; a RAM (Random-Access Memory) 1002; a ROM (Read-Only Memory) 1003; an HDD (Hard-Disk Drive) or an SD (Secure Digital) card reader 1004, or any other device adapted to read information stored on non-transitory information storage medium; and a communication interface COM 1005.

The communication interface COM 1005 enables the wireless transmitter TX 110 to transmit frames to the wireless receivers $RX_1$ 121, $RX_2$ 122, . . . , $RX_{Ktot}$ 123 and to receive feedback information from the wireless receivers $RX_1$ 121, $RX_2$ 122, . . . , $RX_{Ktot}$ 123. The communication interface COM 1005 comprises the digital precoder 132, the modulators 134, the analog precoder 135 and the massive antennas set 136.

CPU 1001 is capable of executing instructions loaded into RAM 1002 from ROM 1003 or from an external memory, such as an SD card via the SD card reader 1004. After the wireless transmitter TX 110 has been powered on, CPU 1001 is capable of reading instructions from RAM 1002 and executing these instructions. The instructions form one computer program that causes CPU 1001 to perform some or all of the steps of the algorithms described hereafter.

Consequently, it is understood that any and all steps of the algorithm described herein may be implemented in software by execution of a set of instructions or program by a programmable computing machine, such as a PC (Personal Computer), a DSP (Digital Signal Processor) or a microcontroller; or else implemented in hardware by a machine or a dedicated chip or chipset, such as an FPGA (Field-Programmable Gate Array) or an ASIC (Application-Specific Integrated Circuit). In general terms, the wireless transmitter TX 110 comprises processing electronics circuitry configured for implementing the relevant steps as described herein.

The invention claimed is:

1. A method for configuring a wireless transmitter comprising a massive transmit antennas arrangement, a set of modulators and an analog precoder mixing modulated analog signals output by the set of modulators onto respective inputs of the massive transmit antennas arrangement, the wireless transmitter further comprising a codebook storing candidate predefined beam configurations corresponding to a specific phase pattern configuration of the analog precoder, transmissions of frames by the wireless transmitter being performed onto respective M time and frequency resources by using combinations of concurrent beam configurations among the candidate predefined beam configurations stored in the codebook so as to perform Multi-User Multiple-Inputs Multiple-Outputs MU-MIMO transmissions toward wireless receivers, the method being implemented by the wireless transmitter, wherein the wireless transmitter further comprises an MU-MIMO fair scheduler, referred to as online MU-MIMO fair scheduler, determining which combinations of concurrent beams to be applied onto the M time and frequency resources so as to take into account a fairness constraint between the wireless receivers in view of effective channel conditions toward the wireless receivers, wherein the wireless transmitter performs a frame transmission onto the M time and frequency resources by configuring the analog precoder according to the combinations of concurrent beams determined by the online fair scheduler, wherein the wireless transmitter further comprises another MU-MIMO fair scheduler, referred to as offline MU-MIMO fair scheduler, implementing a first configuration phase in which the offline MU-MIMO fair scheduler determines candidate combinations of concurrent beams by using long-term statistics associated to performance of transmissions from the wireless transmitter toward the wireless receivers and by taking into account the fairness constraint between the wireless receivers, wherein the online fair scheduler implements a second configuration phase in which the online MU-MIMO fair scheduler selects the combinations of concurrent beams to be applied onto the M time and frequency resources among the candidate combinations of concurrent beams determined by the offline MU-MIMO fair scheduler during the first configuration phase, wherein the wireless receivers effectively targeted with any one of the candidate combinations of concurrent beams are defined by the online MU-MIMO fair scheduler during the second configuration phase, wherein the offline MU-MIMO fair scheduler optimizes an alpha-fair criterion, which leads to the following utility function, where the Np beam configurations showing the best long-term statistics metric values have been retained beforehand for each wireless receiver:

$$\sum_{p=1}^{N_P} \frac{UEBC(P(p, Cidx), U(p, Cidx))}{Rav1(U(p, Cidx))^\alpha}$$

where Rav1 (U(p, Cidx)) is a theoretical achievable total or average rate for the wireless receiver identified by U(p,Cidx) in view of long-term statistics, $\alpha$ is a fairness coefficient such that $-\infty<\alpha<+\infty$, UEBC(P(p,Cidx), U(p, Cidx)) represents the long-term statistics metric value for the beam configuration identified by P(p,Cidx) and for the wireless receiver identified by U(p,Cidx), further where P(p,Cidx) is an absolute identifier of the beam configuration represented by the value of the relative index p among the concurrent beams forming the combination of concurrent beams represented by the value of the index Cidx, and U(p,Cidx) is an absolute identifier of the wireless receiver associated with the beam configuration represented by the value of the relative index p among the concurrent beams forming the combination of concurrent beams represented by the value of the index Cidx, and wherein the online MU-MIMO fair scheduler optimizes the alpha-fair criterion, which leads to the following utility function:

$$\sum_{p=1}^{N_P} \sum_{m=1}^{M} \frac{r'(p, Cidx, m)}{Rav2(U'(p, Cidx, m))^\alpha}$$

where Rav2 (U'(p, Cidx,m)) is a total or average rate achieved for the wireless receiver identified by U'(p, Cidx, m) via a m time and frequency resource among the M time and frequency resources, and further where r'(p, Cidx, m) is instantaneous rate expected to be achieved via a m time and frequency resource for the wireless receiver identified by U'(p, Cidx, m) with the beam configuration B(p,Cidx).

2. The method according to claim 1, wherein the wireless transmitter reinitiates the first configuration phase when receive conditions of the MU-MIMO transmissions have changed compared with a preceding frame transmission.

3. The method according to claim 2, wherein the receive conditions of the MU-MIMO transmissions have changed compared with a preceding frame transmission when at least one of the following conditions is faced:

when the long-term statistics of at least one wireless receiver have changed since the preceding frame transmission;

when the wireless transmitter has not enough data anymore to be transmitted to at least one wireless receiver since the preceding frame transmission;

when the wireless transmitter has received new data to be transmitted to at least one wireless receiver for which there was precedingly not enough data to be transmitted thereto for the preceding frame transmission;

when there is a change, since the preceding frame transmission, in the wireless receivers that are active among all the wireless receivers of a transmission system to which the wireless transmitter belongs; and when there is a change, since the preceding frame transmission, in presence of the wireless receivers in the transmission system.

4. The method according to claim 1, wherein the wireless transmitter further comprises a digital precoder placed upstream the set of modulators, and the online MU-MIMO fair scheduler determines and further applies configurations of the digital precoder during the second configuration phase, namely one configuration of the digital precoder for each one of the time and frequency resources.

5. The method according to claim 1, wherein the wireless transmitter determines the union of the beam configurations appearing in the candidate combinations of concurrent beams and requests the wireless receivers to feedback Channel State Information data related to said beam configurations of the union so as to determine the effective channel conditions toward the wireless receivers.

6. A non-transitory information storage medium storing a computer program comprising program code instructions that can be loaded in a programmable device for implementing the method according to claim 1, when the program code instructions are run by the programmable device.

7. A wireless transmitter comprising a massive transmit antennas arrangement, a set of modulators and an analog precoder mixing modulated analog signals output by the set of modulators onto respective inputs of the massive transmit antennas arrangement, the wireless transmitter further comprising a codebook storing candidate predefined beam configurations corresponding to a specific phase pattern configuration of the analog precoder, transmissions of frames by the wireless transmitter being performed onto respective M time and frequency resources by using combinations of concurrent beam configurations among the candidate predefined beam configurations stored in the codebook so as to perform Multi-User Multiple-Inputs Multiple-Outputs MU-MIMO transmissions toward wireless receivers,
- wherein the wireless transmitter further comprises an MU-MIMO fair scheduler, referred to as online MU-MIMO fair scheduler, determining which combinations of concurrent beams to be applied onto the M time and frequency resources so as to take into account a fairness constraint between the wireless receivers in view of effective channel conditions toward the wireless receivers, wherein the wireless transmitter further comprises means for performing a frame transmission onto the M time and frequency resources by configuring the analog precoder according to the combinations of concurrent beams determined by the online fair scheduler,
- wherein the wireless transmitter further comprises another MU-MIMO fair scheduler, referred to as offline MU-MIMO fair scheduler, implementing a first configuration phase in which the offline MU-MIMO fair scheduler is configured to determine candidate combinations of concurrent beams by using long-term statistics associated to performance of transmissions from the wireless transmitter toward the wireless receivers and by taking into account the fairness constraint between the wireless receivers,
- wherein the online fair scheduler implements a second configuration phase in which the online MU-MIMO fair scheduler is configured to select the combinations of concurrent beams to be applied onto the M time and frequency resources among the candidate combinations of concurrent beams determined by the offline MU-MIMO fair scheduler during the first configuration phase,
- wherein the wireless receivers effectively targeted with any one of the candidate combinations of concurrent beams are defined by the online MU-MIMO fair scheduler during the second configuration phase,
- wherein the offline MU-MIMO fair scheduler optimizes an alpha-fair criterion, which leads to the following utility function, where the Np beam configurations showing the best long-term statistics metric values have been retained beforehand for each wireless receiver:

$$\sum_{p=1}^{N_P} \frac{UEBC(P(p, Cidx), U(p, Cidx))}{Rav1(U(p, Cidx))^\alpha}$$

where Rav1 (U(p, Cidx)) is a theoretical achievable total or average rate for the wireless receiver identified by U(p,Cidx) in view of long-term statistics, a is a fairness coefficient such that $-\infty < \alpha < +\infty$, UEBC(P(p,Cidx), U(p, Cidx)) represents the long-term statistics metric value for the beam configuration identified by P(p,Cidx) and for the wireless receiver identified by U(p,Cidx), further where P(p,Cidx) is an absolute identifier of the beam configuration represented by the value of the relative index p among the concurrent beams forming the combination of concurrent beams represented by the value of the index Cidx, and U(p,Cidx) is an absolute identifier of the wireless receiver associated with the beam configuration represented by the value of the relative index p among the concurrent beams forming the combination of concurrent beams represented by the value of the index Cidx, and wherein the online MU-MIMO fair scheduler optimizes the alpha-fair criterion, which leads to the following utility function:

$$\sum_{p=1}^{N_P} \sum_{m=1}^{M} \frac{r'(p, Cidx, m)}{Rav2(U'(p, Cidx, m))^\alpha}$$

where Rav2 (U'(p, Cidx,m)) is a total or average rate achieved for the wireless receiver identified by U'(p, Cidx, m) via a m time and frequency resource among the M time and frequency resources, and further where r'(p, Cidx, m) is instantaneous rate expected to be achieved via the m time and frequency resource for the wireless receiver identified by U'(p, Cidx, m) with the beam configuration B(p,Cidx).

* * * * *